June 21, 1927.  W. E. GREENAWALT  1,633,091
METALLURGICAL PROCESS
Filed Sept. 7, 1926
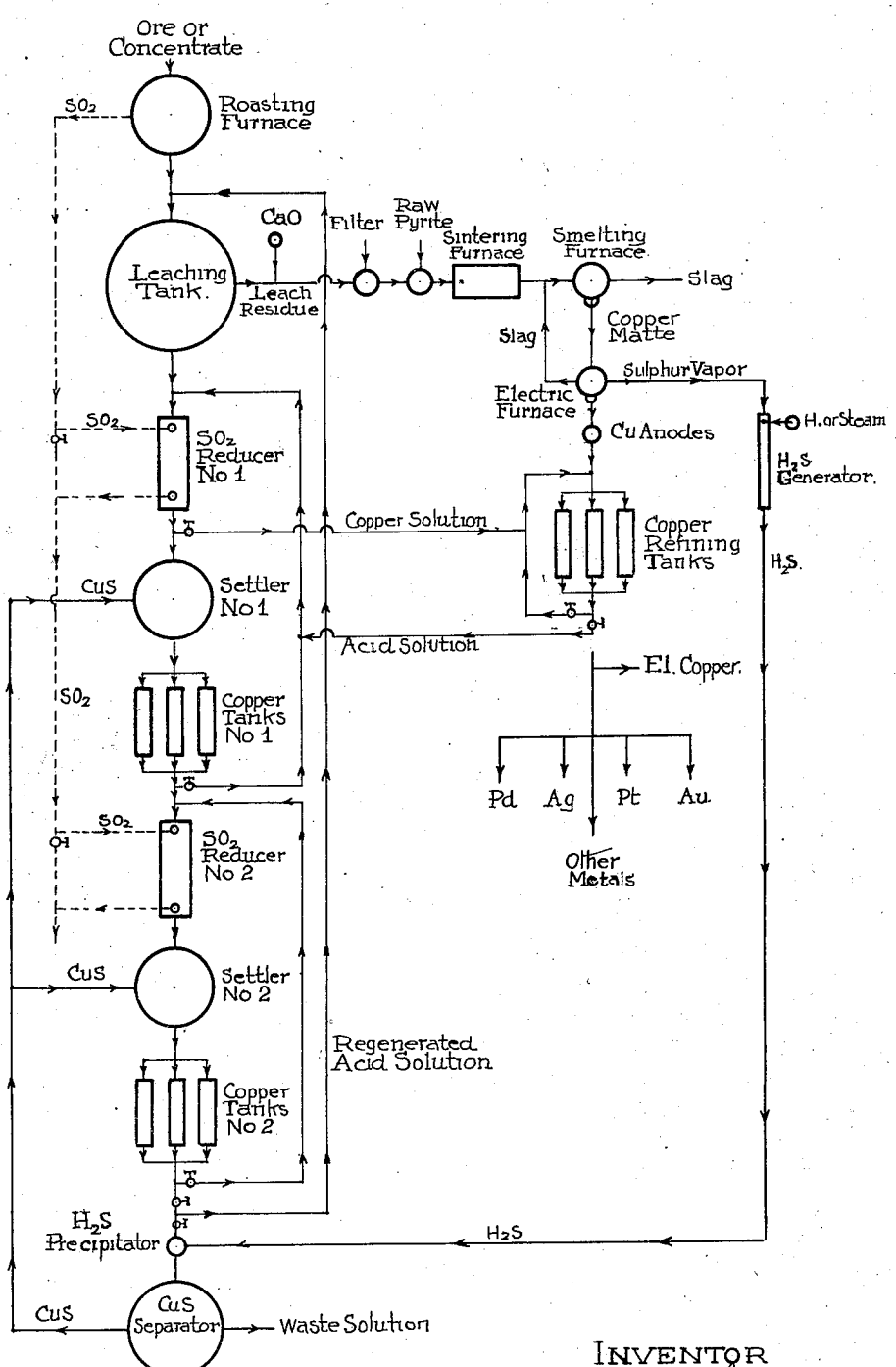

Patented June 21, 1927.

1,633,091

UNITED STATES PATENT OFFICE.

WILLIAM E. GREENAWALT, OF DENVER, COLORADO.

METALLURGICAL PROCESS.

Application filed September 7, 1926. Serial No. 134,099.

The invention is more specifically directed to the treatment of copper ores containing rare or precious metals, or rare or precious metal ores containing copper. Rare metals, such as palladium, platinum and iridium are frequently associated with the precious metals in copper containing ores, and for the purpose of this process the rare metals may be considered the equivalent of the precious metals.

Ores are frequently found which contain copper and the precious metals, and quite frequently such ores contain rare metals which are more valuable than the copper or precious metals. The economical treatment of such ores in the vicinity of the mines has presented a difficult problem, and if the ores are shipped to the large industrial centers for treatment, the margin of profit to the miner is usually somewhat precarious.

The object of the process is to provide an economical treatment for such ores at the mines, which is capable of being operated either in very small or in very large units, as occasion may require, with the production of the copper as the electrolytic metal and the rare or precious metals in highly concentrated form, or preferably as separate elemental metals, salable direct to the consumer.

This process may be considered as an improvement or modification of those described in my Patents, No. 1,353,995, Sept. 28, 1920, and No. 1,483,056, Feb. 5, 1924, and of my pending application, Ser. No. 6,112, Jan. 31, 1925.

The accompanying flow sheet, in diagrammatic plan, will assist in comprehending the process. The process can best be described in reference to a hypothetical ore, which, as mined, may be assumed to contain the following metal values: copper 1.5%, gold 0.05 oz., palladium 0.10 oz., platinum 0.025 oz., and silver 2.0 oz.

The direct treatment of such an ore for the recovery of the metals in elemental from would be quite impractical and uneconomical, except perhaps by smelting under favorable conditions, and such ores are rarely, if ever, found in the vicinity of favorable smelting conditions.

Usually such ores may be effectively concentrated either by gravity or flotation concentration or both combined with a high recovery of the metals in the form of a sulphide concentrate. Assuming a preliminary concentration to recover the metal values in the form of a relatively small amount of high grade concentrate, the concentrate may be assumed, for the purpose of this description, as containing 31.25% copper; 1.0 oz. gold; 2.0 oz. palladium; 0.5 oz. platinum; and 40 oz. silver, per ton of concentrate.

Such a concentrate could be shipped and smelted but probably at a prohibitive cost to the miner and he would lose control of the marketing of his product. The concentrate could be smelted direct, but the smelting of a 31.25% copper concentrate to a 50% or 60% matte would not be much of an improvement and the expense would be considerable. If the concentrate is roasted and leached, the recovery of the rare or precious metals from the large volume of leached residue by solvent methods alone also presents a difficult and probably an impractical condition.

The present method contemplates a departure from the ordinary smelting and leaching methods, in which however both methods are employed in such a relation as to conveniently and economically give the copper as the electrolytic metal and the rare or precious metals in a highly concentrated or in elemental form.

In carrying out the process, the concentrate is carefully roasted so as to make a large portion of the copper soluble in water and a very large portion soluble in a dilute acid solution. It is difficult to roast such a high grade concentrate to get over 95% to 98% extraction of the copper by ordinary leaching methods. For the purpose of this process a higher extraction is not necessary, nor is it desirable.

The roasted concentrate is then leached with water or a dilute acid solution to extract the copper. The copper which is soluble in water or dilute acid is easily and quickly extracted. The rare or precious metals remain in the residue.

The copper solution from the leaching tank, containing salts of iron, flows into the $SO_2$ reducer, where ferric iron is reduced to the ferrous condition by the $SO_2$ obtained from roasting the sulphide concentrate. The reduced solution then flows into the storage or settling tank No. 1, where the ferric iron is still further reduced by the small excess of $SO_2$ dissolved in the solution, and the solution is clarified. The solution then flows into the copper tanks No. 1, where the copper is deposited as the electrolytic metal with the simultaneous regeneration of acid and ferric iron. A portion of the solution from the copper tanks No. 1 is returned to the reducer No. 1, while another portion— the advance flow—is flowed into the reducer No. 2 and from there to settler No. 2, and into the copper tanks No. 2, where more copper is deposited and acid and ferric iron regenerated. A portion of the solution from the copper tanks No. 2 is returned to the $SO_2$ reducer No. 2, while another portion— the advance flow—is returned to the roasted concentrate to pass through another complete cycle. In this way the copper is extracted from the roasted concentrate and is converted into the electrolytic metal. When the copper in the concentrate has been sufficiently extracted, the concentrate residue is ready for the next step in the treatment. The amount of copper it is desirable to keep in the residue will be determined by the operator and will have to be determined by experience. Usually it will be the copper which is not readily soluble in an acid solution, and this will usually be the desired amount for the succeeding step in the process, altho the residual copper in the leached concentrate residue may vary within wide limits without interfering with the successful operation of the process. A fair basis would be an extraction of 30% of the 31.25% of the copper in the concentrate, or an extraction of 96%, or 600 pounds of copper per ton of concentrate.

If the capacity of the plant is assumed as ten tons per day, the daily output of electrolytic copper from leaching the roasted concentrate would be 6000 pounds. The residue would still contain 1.25% of the 31.25% copper in the original concentrate and all of the rare or precious metals. But the residue will not weigh more than half of the original concentrate, since most of the copper has been extracted, the sulphur which was originally combined with the copper has been eliminated, the sulphur which was combined with the iron has been exchanged for oxygen, and other volatile and soluble constituents of the original concentrate have been removed in the roasting and leaching. The residue may now be assumed to weigh half as much as the original concentrate, but it will contain all of the rare or precious metals and will assay 2.5% copper, which represents the 1.25% of the 31.25% in the original concentrate.

In cyclically leaching the roasted copper concentrate with an acid solution and electrolyzing the resulting copper solution containing salts of iron, the solution will ultimately become foul. A certain amount of the solution is therefore diverted from the leaching and electrolytic circuit and the copper precipitated therefrom and the solution wasted. A certain amount of washwater is added to make up the loss, and this washwater also tends to greatly reduce the soluble copper content of the leached residue, but will not remove all of the soluble copper.

In order to avoid waste washwater complications, the residue after it is leached and partly washed as described, is treated with lime to neutralize the solution and to precipitate the soluble copper in the residue. The residue is then filtered or dewatered in an ordinary filter to remove the excess water, and sintered. The sintered residue is then smelted, preferably with just enough raw sulphide ore to make a suitable matte to make a high recovery of the copper and rare or precious metals. The sulphide material should preferably be precious metal bearing pyrites, free or quite free from copper, but containing enough silica to flux off excess iron. Such a procedure will give a clean slag and the metal values will be in fairly concentrated form. If one smelting is not sufficient to give the concentration desired, the first matte may be resmelted, so that the matte will be largely or entirely in the form of $CuS$ or $Cu_2S$, containing little or no iron, altho it will be difficult to eliminate the iron entirely. It is desirable for the best operation of the process to eliminate it as much as practical. If resmelting of the first matte is necessary, the slag from the second smelting may be added to the first smelting charge of another lot. In this way a very high recovery of the copper and rare or precious metals may be made from the leach residue in the form of a highly concentrated matte and at a relatively small cost for smelting. It should be remembered that the residue smelted is only half that of the original concentrate.

Disregarding the small loss in smelting, the matte will consist principally of 250 pounds of copper with the combined sulphur of from 150 to 175 pounds, or say 375 pounds in all, and this matte or copper sulphide will contain all of the rare or precious metals, or approximately, copper 250 pounds; gold 10.0 oz.; palladium 20.0 oz.; platinum 5.0 oz.; and silver 400 oz. It will have an approximate value of $2,600.00, and will permit of careful and economical treatment to recover the various metals in marketable form.

The small portion of high grade matte, weighing about 375 pounds, is introduced into an electric furnace, preferably in hot fluid form as it comes from the smelting furnace. The temperature is raised in the electric furnace to dissociate the copper and sulphur. The sulphur of the $CuS$ is volatilized at a comparatively low temperature, but it requires a high temperature—practically a white heat—to volatilize the sulphur of the $Cu_2S$. The volatilized sulphur, as sulphur vapor, may be combined with hydrogen to form hydrogen sulphide, and the hydrogen sulphide so produced may be used to precipitate copper from lean and foul solutions.

By properly adjusting the temperature in the electric furnace and the time of treatment the copper matte or copper sulphide can be reduced to the impure metal or as the metal mixed with a relatively small amount of sulphur, or mixed with as much sulphur as practice will show to be the most convenient and the most economical. The resulting impure copper is cast into anodes and electrolytically refined, preferably and conveniently by using the rich copper solution from leaching the roasted copper concentrate as the electrolyte. For this purpose the rich copper solution may be taken from the leaching tank, and flowed through the refining tanks, and back to the leaching and electrolytic circuit at a rate determined by practice to be the best. The copper of the anodes will be deposited as the pure electrolytic metal in an electrolyte which can easily be kept at a desired standard of acidity or of soluble impurities. The soluble impurities will not usually be of the harmful kind, such as arsenic, antimony and bismuth. The rare and precious metals, being insoluble in a sulphate electrolyte, will accumulate in the bottom of the copper tanks, and when the accumulation, in the form of anode slimes, is sufficient, the slimes may be removed and refined to separate, or recover, the rare and precious metals in elemental or marketable form.

The copper matte, as derived from the smelting furnace, and consisting largely or entirely of CuS and $Cu_2S$, if introduced into the electric furnace in a hot fluid condition, requires only a relatively small amount of heat to elevate and maintain the matte at the dissociation temperature of the copper and sulphur.

The rapidity of dissociation of the cuprous sulphide is governed by the temperature, and the temperature is regulated by the electric current. If steam is introduced into the electric furnace, a mixture of sulphur and hydrogen sulphide will issue from the furnace. It is preferred to combine the steam or hydrogen with the sulphur outside of the furnace.

Hydrogen sulphide begins to dissociate at about 400 deg. C., and increases with the rise in temperature. Careful regulation of the combining gases is important, and the temperature of the gases should not greatly exceed 500 deg. C. to prevent dissociation of hydrogen sulphide.

While the regulation of the temperature of the cuprous sulphide in the electric furnace is quite easy, the regulation of the temperature of the gases in the furnace is quite difficult, if not impractical, to get the maximum amount of hydrogen sulphide with a minimum amount of free hydrogen and free sulphur.

To meet this condition, the gases are passed through the $H_2S$ generator, where the conditions for the maximum production of hydrogen sulphide can be controlled and regulated. The temperature may be maintained to get the maximum formation of hydrogen sulphide from the uncombined hydrogen and sulphur vapor, with the minimum amount of disintegration of the hydrogen sulphide. In addition to the close regulation of temperature, the $H_2S$ generator may and usually will contain material which promotes the formation of hydrogen sulphide, such as pumice or glass, either of which appears to act as a catalyst. The generator may consist of a tube or chamber, containing a catalyst, such as pumice, which may be heated indirectly through the walls of the chamber, or directly by an electric current, to the desired temperature, or say, from 400 to 500 deg. C. The mixture of hydrogen sulphide, hydrogen or steam, and sulphur vapor is passed through the $H_2S$ generator to combined the uncombined hydrogen or steam with the uncombined sulphur vapor to form an equivalent of hydrogen sulphide. The gas is then used to precipitate the copper or other metals from solutions, especially from waste foul copper solutions and lean wash waters.

The $H_2S$ generator may conveniently consist of a chamber or tube filled with coke, as well as other material, and heated to the desired temperature by means of an electric current. In this way the desired reducing conditions may be maintained and the temperature may be closely regulated to get a maximum amount of hydrogen sulphide from the sulphur vapor from the electric furnace.

In the production of hydrogen sulphide, either in the electric furnace or in the $H_2S$ generator, a hydrocarbon, preferably in the form of oil, may be used with or without steam and forms a convenient way of supplying hydrogen or a hydrogen containing fluid and maintaining the reducing atmosphere desired for good operating conditions. Excellent results can be obtained by introducing hydrogen or a hydrogen containing fluid into the electric furnace or into the $H_2S$ generator. The source of hydrogen which is best available for any particular condition would naturally be used.

The hydrogen sulphide is applied to the copper solutions in the $H_2S$ precipitator, where the copper and some of the other metals are precipitated from the solutions, with the simultaneous regeneration of acid. The solution, with the copper sulphide in suspension, flows into the CuS separator, where the CuS is separated from the barren solution. The CuS is preferably applied to the electrolyte of the leaching and electrolytic circuit, where it may be used to reduce the ferric iron produced by the electrolytic deposition of the copper to the ferrous condition, while at the same time the copper of the precipitate is converted into the electrolytic metal, as described more fully in my Patents, No. 1,340,826, May 18, 1920, and No. 1,357,495, Nov. 2, 1920.

It will be seen, in treating ten tons of concentrate per day, that only about five tons of residue is smelted, including the pyritic addition to the charge; that the five tons of leached residue will be concentrated by smelting into about 375 pounds of matte; and that by treating the matte in the electric furnace to dissociate the copper and sulphur, the resulting impure copper will weigh about 250 pounds and contain all of the rare or precious metals originally in the ten tons of concentrate. In this form the rare or precious metals are easily and cheaply separated from the copper by electrolysis, with the copper in the form of the electrolytic metal and the rare or precious metals in a highly concentrated condition from which they can easily be separated, or recovered, from one another.

In smelting the five tons of leached residue, the copper necessary for collecting the rare or precious metals may be kept quite low. The copper content of the smelting charge will largely be governed by the amount of copper which is not easily extracted by leaching, and, as all, or practically all, of the copper remaining in the leached residue is recovered by smelting, the roasting and leaching of the concentrate need not be as carefully carried out as would be necessary under other conditions, and the operator can determine the sufficiency of the extraction of the copper by leaching to best carry out the process as a whole.

With the small amount of copper in the leached residue, the slag from the smelting will be very low in copper, especially as contrasted with a slag if the concentrate containing 31.25% copper were smelted, and the matte, in smelting the residue, will be adjusted so as to make a high recovery of the rare or precious metals as well as the copper. In re-smelting the matte, or its concentration or conversion in the electric furnace, the slag will contain appreciable values in copper and the rare or precious metals, and this slag is returned to the smelting furnace. This procedure makes possible a high recovery of the metals, and gives a concentrated matte, containing little or no iron, for further treatment. It is preferred to run the high grade matte from the smelting furnace in a molten condition into the electric furnace. This insures economy of fuel and energy and greatly facilitates the operation of the electric furnace.

I claim:

1. A process of treating copper concentrate containing rare or precious metals comprising, roasting the concentrate, leaching the roasted concentrate with a solvent for the copper, then when the desired amount of copper has been extracted from the roasted concentrate by leaching, smelting the residue to concentrate the residual copper and the rare or precious metals into a matte, heating the matte to dissociate copper and sulphur, subjecting the resulting crude copper containing the rare or precious metals to electrolysis to deposit the copper as the electrolytic metal, and recovering the rare or precious metals from the residual slime.

2. A process of treating copper concentrate containing rare or precious metals comprising, roasting the concentrate, leaching the roasted concentrate with an acid solution to extract the copper, then when the copper has been sufficiently extracted by leaching smelting the residue to concentrate the residual copper and the rare or precious metals into an impure copper, casting the resulting impure copper into anodes, and refining said anodes in an electrolyte obtained from leaching the roasted copper concentrate.

3. A process of treating copper concentrate containing rare or precious metals comprising, roasting the concentrate, leaching the roasted concentrate with an acid solution to extract the copper, electrolyzing the resulting copper solution to deposit the copper and regenerate acid, returning the regenerated acid solution to the roasted concentrate and repeating the cycle until the copper has been sufficiently extracted from the roasted concentrate, then smelting the residue to copper matte, heating the resulting matte in an electric furnace to dissociate the copper and sulphur, electrolyzing the resulting impure copper product to obtain the copper as the electrolytic metal, and treating the resulting residue to recover the rare or precious metals.

4. A process of treating copper concentrate containing rare or precious metals comprising, roasting the concentrate, leaching the roasted concentrate to extract the copper, then when the copper in the roasted concentrate has been sufficiently extracted, smelting the roasted concentrate residue to obtain the residual copper and rare or precious metals in a copper matte, heating the matte to dissociate the combined copper and sulphur, applying a hydrogen containing fluid to the resulting sulphur vapor to form hydrogen sulphide, and precipitating copper from the leach copper solution with said hydrogen sulphide.

5. A process of treating copper concentrate containing rare or precious metals comprising, roasting the concentrate, leaching the roasted concentrate to extract the copper, then when the copper in the roasted concentrate has been sufficiently extracted adding a pyritical material to the leached residue and smelting the mixture of residue and pyritic material to concentrate the residual copper and the rare or precious metals of the mixture into a matte, heating the resulting matte to dissociate combined copper and sulphur, casting the resulting impure copper into anodes, and refining said anodes in the solution obtained from leaching the roasted copper concentrate as the electrolyte.

6. A process of treating copper concentrate containing rare or precious metals comprising, roasting the concentrate, leaching the roasted concentrate with an acid solution to extract the copper, then when the desired portion of the copper has been extracted adding a caustic alkali to the residue, filtering the residue, smelting the residue to concentrate the residual copper and the rare or precious metals into a matter, dissociating the copper and sulphur of the matte in an electric furnace, and treating the resulting impure copper to obtain the copper as the electrolytic metal and the rare or precious metals as the elemental metals.

7. A process of treating copper concentrate containing rare or precious metals comprising, roasting the concentrate, leaching the roasted concentrate to extract the copper, then when the copper in the roasted concentrate has been sufficiently extracted by leaching adding a pyritic material to the leached residue, smelting the mixture of residue and pyritic material to concentrate the copper and the rare or precious metals of the mixture into a matte, heating the matte to dissociate copper and sulphur, casting the resulting impure copper product into anodes and electrolytically refining said anodes to recover the copper as the electrolytic metal, and recovering the rare or precious metals from the anode residue.

8. A process of treating copper concentrate containing rare or precious metals comprising, roasting the concentrate, leaching the roasted concentrate with an acid solution to extract the copper, electrolyzing the resulting copper solution to deposit the copper and regenerate acid, returning the regenerated acid solution to the roasted concentrate and repeating the cycle until the copper has been sufficiently extracted, then smelting the residue into a concentrated copper product containing the rare or precious metals, and electrolytically refining said concentrated copper product in an electrolyte obtained from leaching the roasted copper concentrate.

9. A process of treating copper concentrate containing rare or precious metals comprising, roasting the concentrate, leaching the roasted concentrate with an acid solution to extract a portion of the copper, then when the desired portion of the copper has been extracted by leaching adding a caustic alkali to the residue, filtering the residue, sintering the residue, smelting the sintered material to concentrate the remaining copper in the residue into a matte containing the rare or precious metals, dissociating the copper and sulphur of the matte in an electric furnace, casting the resulting impure copper into anodes, and then electrolytically refining said anodes in the leach copper solution as the electrolyte.

10. A process of treating copper concentrate containing rare or precious metals comprising, roasting the concentrate, leaching the roasted concentrate to extract the copper, then when the copper in the roasted concentrate has been sufficiently extracted by leaching smelting the roasted concentrate residue to obtain the residual copper and the rare or precious metals in a copper matte, heating the matte in a reducing or non-oxidizing atmosphere to dissociate the copper and sulphur, subjecting the resulting crude copper containing the rare or precious metals to electrolysis to deposit the copper as the electrolytic metal and recovering the rare or precious metals from the residue, applying a hydrogen containing fluid to the dissociated sulphur to form hydrogen sulphide, and precipitating copper from the leach solutions with said hydrogen sulphide.

11. A process of treating copper concentrate containing rare or precious metals comprising, roasting the concentrate, leaching the roasted concentrate with an acid solution to extract the copper, electrolyzing the resulting copper solution to deposit the copper and regenerate acid, returning the regenerated acid solution to the roasted concentrate and repeating the cycle until the copper has been sufficiently extracted, then smelting the residue to copper matte, heating the copper matte in an electric furnace to dissociate the copper and sulphur, casting the resulting impure copper into anodes, subjecting the anodes to electrolysis to recover the copper as the electrolytic metal, and recovering the rare or precious metals from the residual anode slimes.

12. A process of treating copper concentrate containing rare or precious metals comprising, roasting the concentrate, leaching the roasted concentrate with an acid solution, separating a portion of the dissolved copper from the resulting residue and precipitating the copper therefrom, precipitating another portion of the dissolved copper in the leached residue, smelting the residue to concentrate the residual copper into an impure metal containing the rare or precious metals, and electrolyzing the impure copper to separate the copper and the rare or precious metals.

13. A process of treating copper concentrate containing rare or precious metals comprising, roasting the concentrate, leaching the roasted concentrate to extract a portion of the copper, smelting the leached concentrate residue to concentrate the remaining portion of the copper into a matte containing the rare or precious metals, treating the matte in an electric furnace to further concentrate the copper and to slag off impurities, adding the slag from the electric furnace to the smelting furnace, and treating the impure copper from the electric furnace to separate the copper and the rare or precious metals.

14. A process of treating copper concentrate containing rare or precious metals comprising, roasting the concentrate, leaching the roasted concentrate to extract a portion of the copper, adding a pyritic material to the leached concentrate residue, smelting the mixture to concentrate another portion of the copper into a copper matte containing the rare or precious metals and wasting the resulting slag, re-smelting the matte to still further eliminate impurities and to still further concentrate the copper and the rare or precious metals, adding the slag from the re-smelting of the matte to a new smelting charge, and treating the resulting concentrated copper product from the matte to separate the rare or precious metals from the copper.

15. A process of treating copper concentrate containing rare or precious metals comprising, roasting the concentrate, leaching the roasted concentrate to extract the copper, then when the copper in the roasted concentrate has been sufficiently extracted, adding lime to the residue, filtering the residue, adding a pyritic material to the residue, smelting the mixture, of residue and pyritic material into a copper matte containing the rare or precious metals, treating the matte to obtain the copper as the impure metal, casting the impure copper into anodes, and refining said anodes in an electrolyte obtained from leaching the roasted copper concentrate.

16. A process comprising, roasting copper concentrate, leaching the roasted concentrate with an acid solution to extract the copper, smelting a copper bearing material containing rare or precious metals to concentrate the rare or precious metals into an impure copper, casting the impure copper containing the rare or previous metals into anodes, and refining said anodes in an electrolyte obtained from leaching the roasted copper concentrate.

17. A process of treating copper concentrate containing rare or precious metals comprising, leaching the concentrate to extract the copper, smelting the leached concentrate residue to concentrate the residual copper and the rare or precious metals into a matte, electrically heating the matte to dissociate the sulphur of the matte, combining hydrogen with the resulting sulphur vapor to form hydrogen sulphide, and precipitating copper from leach solutions with said hydrogen sulphide.

18. A process of treating copper concentrate containing rare or precious metals comprising, roasting the concentrate, leaching the roasted concentrate to extract the copper, adding a pyritic material to the leached copper concentrate residue, smelting the mixture of leached residue and pyritic material to concentrate the residual copper and the rare or precious metals into a matte, introducing the hot fluid matte into an electric furnace and heating the matte to dissociate the sulphur of the matte, and treating the resulting impure copper to separate the copper and the rare or precious metals.

19. A process of treating copper concentrate containing rare or precious metals comprising, roasting the concentrate, leaching the roasted concentrate to extract the copper, smelting the leached roasted concentrate residue to concentrate the residual copper and the rare or precious metals into a copper matte, electrically heating the resulting matte to eliminate the sulphur of the matte, and treating the resulting impure copper to separate the copper and the rare or precious metals.

20. A process of treating copper concentrate containing rare or precious metals comprising, leaching the concentrate to extract the copper, smelting the leached concentrate residue to concentrate the residual copper and the rare or precious metals into a matte, treating the matte to eliminate iron and to further concentrate the matte in copper sulphide, electrically heating the resulting concentrated matte to eliminate sulphur, and treating the resulting impure copper product to separate the copper and the rare or precious metals.

WILLIAM E. GREENAWALT.